United States Patent [19]
Mizutani et al.

[11] 3,953,565
[45] Apr. 27, 1976

[54] PROCESS FOR PRODUCING FLAME-RETARDANT SHAPED ARTICLES OF THERMOPLASTIC SYNTHETIC RESINS

[75] Inventors: Yukio Mizutani; Kazuo Shikata; Shunichi Nakamura, all of Tokuyama; Michio Yoshimizu, Yamaguchi, all of Japan

[73] Assignee: Tokuyama Soda Kabushiki Kaisha, Japan

[22] Filed: Oct. 18, 1974

[21] Appl. No.: 515,930

[30] Foreign Application Priority Data
Oct. 29, 1973 Japan.............................. 48-120680
Oct. 31, 1973 Japan.............................. 48-121748

[52] U.S. Cl. ...................... 264/210 F; 260/37 PC; 260/40 P; 260/42.13; 260/42.54; 260/42.55; 260/42.57; 260/45.7 P; 260/45.7 S; 260/45.7 R; 260/45.75 R; 260/45.75 P; 264/210 R; 264/211
[51] Int. Cl.².......................................... C08J 3/20
[58] Field of Search ............ 264/210 F, 210 R, 211, 264/340; 117/137; 260/45.75, 45.7, 37 PC, 40 P, 42.13, 42.25, 42.46, 42.54, 42.55, 42.57

[56] References Cited
UNITED STATES PATENTS

| 3,202,567 | 8/1965 | Muri et al. ............................ 106/15 |
| 3,451,842 | 6/1969 | Kurz et al. ........................... 117/137 |
| 3,553,302 | 1/1971 | Susuki et al. ........................ 264/210 |
| 3,694,399 | 9/1972 | Schwarcz............................. 264/211 |

OTHER PUBLICATIONS

The Chemistry and Uses of Fire Retardants by Lyons, 1970, pp. 85 and 88.

*Primary Examiner*—V. P. Hoke
*Attorney, Agent, or Firm*—Sherman & Shalloway

[57] ABSTRACT

A process for producing flame-retardant shaped articles of thermoplastic synthetic resins is disclosed which process comprises dispersing homogeneously in a thermoplastic synthetic resin an inorganic metal compound and a surfactant, said inorganic metal compound being one capable of forming a hydrate by reacting with a member of the group consisting of water and an aqueous acid solution, forming the resulting composition into a desired shaped article, and thereafter contacting the thus obtained shaped article with a member selected from the group consisting of water and an aqueous acid solution, thereby converting said inorganic metal compound contained in said shaped article to a hydrate.

45 Claims, No Drawings

PROCESS FOR PRODUCING FLAME-RETARDANT SHAPED ARTICLES OF THERMOPLASTIC SYNTHETIC RESINS

This invention relates to a process for preparing flame-retardant shaped articles of thermoplastic synthetic resins. More particularly, the present invention relates to a process for producing flame-retardant shaped articles of thermoplastic synthetic resins containing a hydrated inorganic metal compound.

Lately, the ready flammability of the thermoplastic synthetic resins that are used for clothing, building materials, interior decorating materials, luggage, handbags, automotive parts, electrical appliances, etc., is being regarded as a matter needing improvement and studies are being conducted with a view to finding methods of rendering these materials flame retardant.

As methods of rendering the thermoplastic synthetic resins flame retardant, the principal methods that have been suggested in the past include that of reducing the amount of heat evolved at the time of burning by the addition of a relatively great amount of an inorganic compound such as antimony trioxide, aluminum hydroxide and calcium silicate, and that of terminating the auto-oxidation of the thermoplastic resin by the addition at the time of burning of for instance, a phosphoric acid ester or a halogenated aromatic compound. However, fully satisfactory results are not generally obtained by the former method. On the other hand, while it is possible to impart self-extinguishability to the thermoplastic resins, e.g., polyethylene, polypropylene, etc., in the latter method by the use of the chemicals in an amount of about 5 – 30 percent, the chemicals used are relatively costly, with the consequence that there is the drawback that the resulting flame-retardant shaped article of thermoplastic synthetic resin becomes expensive.

There has also been suggested a method which comprises admixing with the thermoplastic resin either water or a water-containing inorganic powder, e.g., a gel-like product of aluminum hydroxide or the various hydrates, and then molding the mixture. This method intends to impart self-extinguishability to the thermoplastic resin by a mechanism wherein the fire point temperature is reduced to below the ignition temperature by the absorption of the heat evolved during the burning of thermoplastic synthetic resin, this being accomplished by means of the sensible heat and the latent heat of vaporization of the water. However, the melt-molding temperature of the thermoplastic resins is usually above 100° C. and is thus higher than the dehydration temperature of many of the hydrates. Hence, the water evaporates during the molding to cause the formation of voids in the shaped article, with the consequence that not only difficulty is experienced in obtaining shaped articles having a smooth surface, but it also frequently happens that the intended flame retardancy cannot be imparted.

An object of the present invention is to provide a method of producing at low cost shaped articles of thermoplastic synthetic resins having satisfactory self-extinguishing characteristics.

Another object of the present invention is to provide, as an improvement to the hereinbefore-described conventional method of imparting flame retardancy to shaped articles of thermoplastic synthetic resins by the incorporation therein of a hydrate, a new method wherein the loss of the hydrate during the step of molding the resin is prevented.

Other objects and advantages of the invention will become apparent from the following description.

As a means of achieving the foregoing objects of the present invention, there is provided in accordance with this invention a method of producing flame-retardant shaped articles of thermoplastic synthetic resins comprising dispersing homogeneously in a thermoplastic synthetic resin a surfactant and an inorganic metal compound capable of forming a hydrate on reacting with either water or an aqueous acid solution, molding the resulting composition into a desired shaped article, for example, a sheet or filament followed, if necessary, by drawing the shaped article, and thereafter contacting it with either water or an aqueous acid solution, thereby converting the aforesaid inorganic metal compounds contained in said shaped article to a hydrate.

By the expression "flame-retardant shaped article of thermoplastic synthetic resins," as used herein, is meant a shaped article of thermoplastic synthetic resins whose flammability has been reduced to below that which the resins inherently possess. In general, when self-extinguishability has been imparted to a flammable resin, it can be said that the resin has been made flame retardant as intended by the present invention. On the other hand, by the expression "self-extinguishability" is meant the property of a resin specimen, which on having been ignited by bringing a flame in contact therewith continues to burn in air, but becomes extinct on the removal of the flame therefrom. Hence, the shorter the time to extinction after removal of the flame, the greater is its self-extinguishing property. That is, this indicates the possession of excellent flame retardancy.

The thermoplastic synthetic resins to which the present invention is applicable include those polymers which possess thermoplasticity and, in addition, do not exhibit excessive thermal decomposition during melting and can be melt-molded. As examples of these resins, mention can be made of the homopolymers of such olefins as ethylene, propylene and butylene; copolymers, and especially block copolymers, consisting of optional combinations of these olefins; polymers of vinyl compounds such as vinyl chloride, acrylonitrile, methyl acrylate, vinyl acetate and styrene; copolymers consisting of optional combinations of these vinyl monomers; copolymers of the foregoing olefins with the vinyl monomers; copolymers and terpolymers of the foregoing olefins with diene compounds; polyesters such as polyethylene terephthalate; polyamides such as nylon; polycarbonates and polyoxymethylene.

On the other hand, as the inorganic metal compound that can form a hydrate by reacting with either water or an aqueous acid solution, mention can be made of such, for example, as metal oxides such as calcium oxide, alumina, silica, boron oxide, titania, zirconia and iron oxides; the acid, neutral and basic salts or complex, salts such as magnesium hydrogen phosphate, magnesium phosphite, basic magnesium carbonate, magnesium chloride, magnesium sulfate, calcium carboonate and aluminum sulfate; cements such as portland cement and other cements, zeolites, clays, and the like.

Of these inorganic metal compounds, the various cements, quicklime, soluble anhydrous gypsum, calcined gypsum, alumina, silica, boron oxide, titania, zirconia, iron oxides, zeolites, magnesium hydrogen phosphate, magnesium phosphite, basic magnesium carbonate, magnesium chloride and barium hydroxide form, on reaction with water, the hydrates of these inorganic metal compounds, the gypsums and cements being especially suitable in this respect. As to which compounds are capable of forming a hydrate on reaction with water should be readily apparent to those skilled in the art from the illustrations given above. On the other hand, in the group of inorganic metal compounds that can form a hydrate on reaction with an aqueous acid solution included are calcium hydroxide, calcium carbonate, tricalcium phosphate, calcium chloride, calcium acetate and calcium oxalate, in addition to those that form a hydrate on reaction with water. The reaction with the acid and water can be represented by, for instance the equation $CaCO_3 + H_2SO_4 + 2H_2O \quad CaSO_4 \cdot 2H_2O$. As to which inorganic metal compounds are capable of forming an inorganic hydrate on reaction with an acid and water should be readily apparent to those skilled in the art from the foregoing illustrations. The inorganic metal compounds which are especially preferred are calcium hydroxide, calcium carbonate and calcium oxide. Further, the inorganic metal compound used in this invention is one having a particle size usually of preferably not more than an averate of 500 microns, especially preferred being one having a particle size ranging from 0.01 to 200 microns.

The hydrate, as used herein, is a compound having water chemically adsorbed thereto and include, for example, compounds having addition water, compounds that have adsorbed water physically, e.g. a compound which has been bonded with water by the van der Walls force, compounds having water of crystallization, and compounds having constitution water.

The surfactant used in this invention is one possessing conjointly in its molecule a portion which exhibits hydrophilicity and a portion which exibits lipophilicity The surfactant is chosen from anionic or cationic surfactants which contain a group that dissociates as an anion or a cation in water and a lipophilic group such as a hydrocarbon group, nonionic surfactants containing a nonionizing hydrophilic group and a lipophilic group, and the amphoteris surfactants which dissociate into both cations and anions. As specific examples of these surfactants, included are anionic surfactants such as sodium dodecylbenzenesulfonate sodium dioctylsulfosuccinate and sodium laurylaminopropionate; cationic sufactants such as distearyldimethylammonium chloride, polyoxyethylenealkylamine and laurylamineacete; amphoteric surfactants such as lauryldimethylbentain; and nonionic surfactants such as propylene glycol monostearate, glyceryl monostearate, sorbitan monolaurate, polyoxyethylene-polyoxypropylene ethyl alcohol ester, polyoxyethylene sorbitan monostearate, polyoxyethylene stearate, polyoxyethylene cetyl ether, polyoxyethylene nonylphenyl ether, polyoxyethylene octylphenol formaldehyde condensation product, tripolyoxyethylenealkylether phosphoric acid ester and polyoxyethylene stearate. Of these surfactants, especially preferred in this invention are the sodium alkylbenzenesulfonate type anionic surfactants such as sodium dodecylbenzenesulfonate and nonionic surfactants having a HLB value of 8–17. The HLB value, as here used, is a criterion for indicating the hydrophilic-lipophilic balance of the surfactant and is indicated by a numerical value from 1 to 40. The greater this value, the stronger is the hydrophilicity and, on the other hand, the smaller this value, the greater is the lipophilicity. Further, the water-soluble polymers such as polyacrylic acid, polyvinyl alcohol, ethyl cellulose and ethyl cellulose can also be used, though they are inferior to the foregoing cationic, anionic, nonionic and amphoteric surfactants in their effects. Hence, these water-soluble polymers are also included in the category of surfactants, as used herein.

As the first step of this invention, at least one inorganic metal compound and a surfactant are homogeneously dispersed in the thermoplastic synthetic resin to prepare a composition. The inorganic metal compound is used in an amount of 100 – 500 parts by weight, and preferably 230 – 400 parts by weight, per 100 parts by weight of the thermoplastic synthetic resin, while the surfactant is used in an amount of 0.01 – 500 parts by weight, preferably 0.1 – 100 parts by weight and further preferably 1 – 40 parts by weight, per 100 parts by weight of the thermoplastic synthetic resin.

For dispersing the inorganic metal compound and the surfactant homogeneously in the thermoplastic synthetic resin, the procedures that are usually used in mixing inorganic fillers and chemicals in synthetic resins and rubber can be employed with no restriction whatsoever. For instance, the following methods can be used: that consisting of adding the inorganic metal compound to the thermoplastic synthetic resin in powder or pellet form, following which the mixture is melt blended using mixing rolls or a kneader, and thereafter the surfactant is added; that consisting of dry blending the finely divided thermoplastic synthetic resin, inorganic metal compound and surfactant in, for example, a blender or a Henschel mixer and thereafter melt blending the resulting mixture using either mixing rolls, or an extruder or kneader; that consisting of first dry blending the surfactant with the inorganic metal compound with a blender or Henschel mixer and thereafter melt blending this mixture with mixing rolls or an extruder or kneader along with the thermoplastic synthetic resin; or other suitable methods.

As the second step of this invention, the thermoplastic synthetic resin composition obtained as hereinabove described by homogeneously dispersing therein an inorganic metal compound and a surfactant is used, and the shaped article is then obtained by operating as in the case with the usual methods of molding thermoplastic synthetic resins, i.e., melt spinning, extruding, injection molding, blow molding, etc. The shaped articles in which the effects of the present invention are most conspicuously demonstrated are such products as film, foil and sheet (hereinafter generically referred to as sheet) and filament, fiber and yarn (hereinafter generically referred to as filament). That is to say, in the case of these sheets or filaments, the reaction with the water or aqueous acid solution takes place more smoothly in the hereinafter-described third step, with the consequence that flame retardance can be imparted very readily.

Further, still greater effects can be expected in the case of the sheets or filaments by carrying out their drawing in customary manner after their molding. As methods of drawing a sheet, employable are the known methods of producing the uni- or biaxially drawn sheets, for example, that of immediately drawing continuously in a uni- or biaxial direction the sheet that comes out from the extruder or calendering apparatus, or that of first winding up the sheet in an undrawn state and thereafter drawing the sheet in the uni- or biaxial direction with a drawing apparatus, or that of using a batch type drawing apparatus to draw a sheet that has been obtained by pressing. That desirable flame retardancy is brought about by such drawings is believed to be due to the inorganic metal compound emerging to the surface of the shaped article of the thermoplastic synthetic resin or the formation of interstices between the resin and the inorganic metal compound being brought about, with the consequence that, in cooperation with the action of the surfactant, the hereinafter-described reaction for forming the hydrate is facilitated. In addition, the apparent specific gravity of the thermoplastic synthetic resin composition is reduced due to the formation of interstices by the drawing operation. Furthermore, in the case of a sheet, there is formed a minute unevenness in the surface to provide satisfactory printability and adhesiveness. The drawing is usually carried out to a volume draw ratio of 50 – 400 percent, and preferably 200 – 300 percent. The volume draw ratio Y, as herein used, is a value as expressed by the relationship $Y = W\text{-}V/V \times 100$, wherein V is the volume per unit weight before drawing and W is the volume per unit weight after drawing. The drawing temperature used in the case of a crystalline resin ranges from room temperature to below the melting point of the resin or in the case of a resin that decomposes at elevated temperatures from room temperature to the softening point of the resin. For instance, good results are obtained by drawing the polypropylene resins at a temperature in the range of 20° – 150° C., the polyethylene resins at a temperature in the range of 20° – 110° C., and the vinyl chloride resins at a temperature in the range of 20° – 80° C.

Next, as the third step in this invention, the shaped article of the thermoplastic synthetic resin composition is treated with either water or an aqueous acid solution thereby causing a reaction to take place between the water or aqueous acid solution and the aforesaid inorganic metal compound contained in the thermoplastic synthetic resin to form in situ a hydrate of said inorganic metal compound. While the mechanism by which the reaction of the water or aqueous acid solution with the inorganic metal compound contained in the hydrophobic thermoplastic synthetic resin is made possible is not exactly clear, this reaction, in all probability, is made possible by the presence in the resin of a suitable amount of a surfactant conjointly dispersed homogeneously therein with an inorganic metal compound. The treatment of the thermoplastic synthetic resin with the water or aqueous acid solution may be accomplished usually by a procedure consisting of dipping the resin in water or an aqueous acid solution at a temperature on the order of 0° – 150° C., and preferably 5°–90° C. While the dipping time may be suitably decided in accordance with the degree of progress of the reaction, usually used is a time ranging from about 10 seconds to about 10 hours. And naturally, it is necessary to choose either water or the aqueous acid solution in accordance with the class of the aforesaid inorganic metal compound that is dispersed in the thermoplastic synthetic resin, i.e., in the case of an inorganic metal compound which forms a hydrate on reaction with water, water is used, whereas in the case of an inorganic metal compound which forms a hydrate on reaction with an aqueous acid solution, an aqueous acid solution is used. However, such a choice can be very readily determined by those skilled in the art without the requirement of any inventive ability at all. An aqueous sulfuric acid solution can be used with any class of the foregoing inorganic metal compounds in accomplishing the objects of the present invention.

As the aqueous acid solution, that of sulfuric acid or oxalic acid is conveniently used in this invention. The reason for this is that since the sulfates or oxalates of metals possess water of crystallization, flame retardancy is imparted to the thermoplastic resin when these salts are formed in the resin.

As previously indicated, not only still greater flame-retardant effects can be expected but such effects can be achieved much more readily as well when the shaped articles of thermoplastic synthetic resins formed into a sheet or filament are treated with water or an aqueous acid solution after having been drawn. This is due, in all probability, to the formation of interstices in the thermoplastic synthetic resin by which the hydration reaction of the inorganic metal compound proceeds still more readily and satisfactorily, with the consequence that adequate storage of water takes place in the resin.

For obtaining still greater flame-retardant effects, a treatment with conventional flameproofing agents after the shaped article has undergone a hydration reaction by treatment, as above described, with either water or an aqueous acid solution, is also effective. Suitable flameproofing agents that can be used in the present invention include the inorganic ammonium salts such as ammonium sulfate, ammonium chloride, ammonium bromide, ammonium molybdate, ammonium hydrogen phosphate, ammonium dihydrogen phosphate, ammonium borofluoride and ammonium dibotate; and organic halogenated compounds such as phosphoric acid tricresine, halogenated organic phosphate, halogenated paraffin, halogenated polyethylene, tetrabromobisphenol A, tetrabromobenzene and halogenated alkyl esters or ethers of tetrabromobisphenol A. Of these flameproofing agents, especially preferred are ammonium sulfate, ammonium hydrogen phosphate, ammonium dihydrogen phosphate and ammonium bromide. The effects of the treatment with the flameproofing agents are especially conspicuous in the case of the aforementioned drawn shaped articles.

There is imposed no particular restriction as to the method that can be employed in carrying out the treatment with the flameproofing agents. For example, when the flameproofing agent used is a liquid, dipping of the shaped article in the liquid as such or the liquid diluted with a solvent will do. On the other hand, when the flameproofing agent is a solid, it may be used after dissolving in a suitable solvent. While the conditions of the treatment will be suitably decided in accordance with the degree of flame retardancy desired, it will usually suffice to dip the shaped articles in a solution of the flameproofing agent of a concentration on the order of 10–50 percent for a period of 1 – 60 minutes at 20° – 50° C. Of course, the concentration may be as high as, say 100 percent. As a rule, the treatment time can be shortened in proportion as the concentration of the flameproofing agent becomes higher.

The scope of the present invention should be apparent from the foregoing description, and so long as no departures are made from the scope of the present invention, additions and modifications that are usually practiced in the art naturally can find application to the present invention. For instance, it should be understood that the addition to thermoplastic synthetic resins of various chemicals that are usually added thereto, such as stabilizers, plasticizers, pigments, etc., or the addition of a blowing agent for obtaining formed shaped articles is also included within the scope of this invention.

The following examples will serve to illustrate the invention more fully, but these examples are not to be construed as limiting the invention thereto.

The following Examples 1 – 23 are illustrations of the case where the shaped articles are sheets. In these examples the flammability test wss carried out in the following manner in accordance with ASTM Method D-635-63. (I) Dimensions of test piece (thickness × width × length). A. Thermoplastic synthetic resin compositions not containing a halogen atom.
  a. 2 mm × 12.7 mm × 127 mm
  b. 0.4 mm × 25.4 mm × 127 mm
  c. 0.5 mm × 25.4 mm × 127 mm B. Thermoplastic synthetic resin compositions containing a halogen atom.
  d. 2 mm × 7.5 mm × 122 mm
  e. 0.5 mm × 7.5 mm × 122 mm (II) Method of measurement of flammability.

Each of the test pieces (a) – (e) were scribed with reference lines at points 25.5 mm from both ends of the test pieces longitudinally thereof, which lines were designated reference lines No. 1 and No. 2. A portion of the test piece at the reference line No. 2 side was clamped and the test piece was secured to a support with its longitudinal axis horizontal and its transverse axis inclined at 45° to the horizontal. A 20-mesh wire gauze was disposed horizontally under the test piece at a point 9.5 mm below the test piece. After adjusting a ⅜-inch bunsen burner to produce a blue flame 25 mm high, the tip of the flame was brought into contact with the lower corner of the test piece at the reference line No. 1 side for 30 seconds [10 seconds in the case of the test piece (c)]. At the end of 30 seconds, the flame was removed, and the state of burning was observed. If the test piece does not burn to reference line No. 2, it is judged to be self-extinguishing. Further, the time up to extinguishment after removal of the burner flame was also measured. In the case of test pieces which were completely burned, the burning rate was obtained by measuring the time that was required for the test piece to burn from reference line No. 1 to reference line No. 2.

Conjointly with these measurements, the size of the flame, the amount of soot and the presence or absence of dripping were observed. The results of these observations were indicated by means of the following symbols.

| Size of flame: | large (X) | medium (Δ) | small (O) |
| Amount of soot: | great (X) | small (Δ) | none (O) |
| Amount of dripping: | great (X) | small (Δ) | none (O) |

Further, the rate of the reaction and the water content of the test pieces were determined by a thermal analysis, using an apparatus for differential thermal analysis manufactured by Rigaku Denki Company, Ltd., Japan.

EXAMPLE 1

To 50 grams of polypropylene pellets (melt index = 12.0, produced by Tokuyama Soda K. K.) were added 0.2 gram each of BHT (trade name BHT Suwanox, 2,6-ditertiarybutyl paracresol) and DLTP (trade name DLTP "Yoshitomi", dilauryl-thiodipropionate), after which this mixture was wrapped about 3-inch rolls (front roll 15 rpm, back roll 19 rmp) set at a temperature of 200° – 210° C. Next, a calcium compound fully blended in advance with a prescribed amount of a surfactant "Nikkol P 2015" (polyoxyethyleneoctylphenol formaldehyde condensation product of HLB = 13.2, produced by Nikko Chemicals Company, Japan) was added. After completion of the addition of the latter in toto, the resulting mixture was kneaded for a further 5 minutes, after which it was stripped from the rolls to prepare a pressed sheet. The pressed sheet was then preheated for 5 minutes at 170° C., followed by compression molding at 100 kg/cm² and then cooling at the rate of 30° C. per minute to prepare three pieces each of the test pieces (a) and (b), which pieces were then treated with an acid solution. The treatment with the acid solution was carried out by dipping the test pieces for the prescribed period of time in an aqueous 18 weight percent sulfuric acid solution at 3° C. followed by thorough washing in water and vacuum drying for 24 hours at 60° C. The so treated test pieces were then submitted to the flammability test and thermal analysis. The results obtained are shown in Table 1. Further, in Runs 6 and 7 are shown the test results in the case of, respectively the sulfuric acid-treated product of polypropylene admixed with water-soluble magnesium sulfate and the sulfuric acid-treated product of polypropylene admixed with basic magnesium carbonate that forms water-soluble magnesium dihydrate. In the case of these there was a reduction in weight after the treatment with the acid solution.

Table 1-(1)

| Run No. | Calcium compound Class | Average particle size (μ) | Amount (PHR)*1 *1 | Amount of Surfactant (PHF)*2 *2 | Test Piece | Dipping Time (Hr) | Rate of Reaction with Gypsum | Water Content (PHR)*1 |
|---|---|---|---|---|---|---|---|---|
| 1 | heavy calcium carbonate | 3 | 234 | — | (a) | 216 | — | — |
|  | do. |  | " | — | (b) | 96 | 11.6 | 18.2 |
| 2 | do. | 3 | " | 4.3 | (a) | 216 | 44.0 | 21.4 |
|  |  |  | " | " | (b) | 72 | 90.5 | 60.2 |
| 3 | light calcium carbonate | 0.04 | " | 17.0 | (a) | 120 | 93.5 | 51.4 |
| 4 | calcium hydroxide | 10 | 198 | — | (a) | 216 | — | — |
|  | do. |  | " | — | (b) | 96 | 11.6 | 18.2 |
| 5 | do. | 10 | " | 10.2 | (a) | 120 | — | — |
|  |  |  | " | " | (b) | 96 | 89.3 | 61.8 |
| 6 | magnesium sulfate | 5* | 200 | — | (a) | 216 | — | — |
|  | " |  | " | 10.0 | (a) | " | — | — |
| 7 | basic magnesium carbonate | 0.4 | 200 | 20.0 | (a) | 120 | — | — |

Table 1-(1)-continued

| Run No. | Calcium compound Class | Average particle size (μ) | Amount (PHR)*1 | Amount of Surfactant (PHF)*2 | Test Piece | Dipping Time (Hr) | Rate of Reaction with Gypsum | Water Content (PHR)*1 |
|---|---|---|---|---|---|---|---|---|
|  | ″ | ″ | ″ | ″ | (b) | 96 | — | — |
| 8 | tricalcium phosphate | 10** | 200 | 10.0 | (a) | 216 | — | — |
|  | ″ | ″ | ″ | ″ | (b) | 96 | — | — |
| 9 | gypsum | 10–100 | 200 | 10.0 | (a) | — | — | — |

*First grade reagent was used after pulverization in a vibratory mill
**Special grade reagent was used after pulverization in a vibratory mill Table 1-(2)

| Run No | Time Required for Extinguishment after Ignition | Flammability Test*3 Burning Rate (min/7.6cm) | Size of flame | Amount of Soot | Amount of Dripping | Evaluation |
|---|---|---|---|---|---|---|
| 1 |  | 7 min 12 sec | X | X | Δ | flammable |
|  |  | 22 sec | X | X | X | do. |
| 2 | 2 min 49 sec/ceases to burn before reaching ref. line No. 1 | — | Δ | Δ | Δ | self-extinguishing |
|  | 1 min 55 sec/ceases to burn before reaching ref. line No. 1 | — | Δ | Δ | Δ | do. |
| 3 | 2 min 16 sec/ceases to burn before reaching ref. line No. 1 | — | O | O | O | self-extinguishing |
| 4 |  | 10 min 0 sec | Δ | Δ | Δ | flammable |
|  |  | 1 min 36 sec | Δ | Δ | X | do. |
| 5 | 3 min 52 sec/ceases to burn before reaching ref. line No. 1 |  | Δ | Δ | X | self-extinguishing |
|  | 1 min 27 sec/ceases to burn before reaching ref. line No. 1 |  | Δ | O | O | do. |
| 6 |  | 5 min 18 sec | Δ | X | X | flammable |
|  |  | 26 sec | X | X | X | do. |
| 7 |  | 1 min 20 sec | X | X | X | flammable |
|  |  | 20 sec | X | X | X | do. |
| 8 | 2 min 10 sec/ceases to burn before reaching ref. line No. 1 |  | Δ | Δ | Δ | self-extinguishing |
|  | 1 min 50 sec/ceases to burn before reaching ref. line No. 1 |  | Δ | Δ | Δ | do. |
| 9 |  | 6 min 22 sec | X | X | Δ | flammable |

Notes:
Runs 1, 4, 6, 7 and 9 are controls
*1PHR denotes parts per 100 weight parts of thermopastic resin (equally applicable hereinafter).
*2PHF denotes parts per 100 weight parts of inorganic compound (calcium compound)(equally applicable hereinafter).
*3The expression "ceases to burn before reaching reference line No. 1" was used in the case of those which became self-extinct before reaching reference line No. 1. Further, in the case of the flammable test pieces, their burning rate was indicated by the burning time between the reference lines.
Heavy calcium carbonate: Trade name "Whitone B" (produced by Shiraishi Calcium Company, Japan)
Light calcium carbonate: Trade name "Hakuenka CC" (produced by Shiraishi Calcium Company).
Calcium hydroxide: Reagent 1st grade (produced by Wako Junyaku Company, Japan).
Magnesium sulfate:      do.
Basic magnesium carbonate: Trade name symbol "T" (produced by Tokuyama Soda K.K. Japan).
Tricalcium phosphate: Reagent special grade (produced by Kanto Chemical Company., Japan).

EXAMPLE 2

Example 1 was repeated but using instead of the surfactant "Nikkol R 2015" various other surfactants and as the calcium compound heavy calcium carbonate ("Whitone B"). The results obtained are shown in Table 2.

Table 2 - (1)

| Run No. | Amount of heavy calcium carbonate (PHR) | Amount of Surfactant Class | Amount Mixed (PHF) | Test piece | Dipping time (Hr) | Rate of reaction with Gypsum | Water content (PHR) |
|---|---|---|---|---|---|---|---|
| 1 | 234 | — | — | (a) | 216 | — | — |
|  | ″ |  |  | (b) | 96 | 12.2 | 9.0 |

Table 2 - (1)-continued

| Run No. | Amount of heavy calcium carbonate (PHR) | Amount of Surfactant Class | Amount Mixed (PHF) | Test piece | Dipping time (Hr) | Rate of reaction with Gypsum | Water content (PHR) |
|---|---|---|---|---|---|---|---|
| 2 | 234 | Nikkol R 2015 | 4.3 | (a) | 216 | 44 | 21.4 |
|   | " | " | " | (b) | 96 | 78.7 | 65.9 |
| 3 | 234 | Nikkol PBC-31 | 4.3 | (a) | 216 | — | — |
|   | " | " | " | (b) | 96 | 37.5 | 23.4 |
| 4 | 234 | D B S | 4.3 | (a) | 216 | — | — |
|   | " | " | " | (b) | 96 | 46.5 | 24.4 |
| 5 | 234 | Levenol A conc. | 4.3 | (a) | 216 | — | — |
|   | " | " | " | (b) | 96 | 85.0 | 48.5 |
| 6 | 200 | Nikkol R 2015 | 8.6 | (a) | 216 | — | — |
| 7 | 200 | Nikkol R 2015 | 20.0 | (a) | 216 | — | — |

Table 2-(2)

| Run No. | Flammability Test | | | | | |
|---|---|---|---|---|---|---|
|  | Time Required for Extinguishment after Ignition | Burning Rate (min/7.6cm) | Size of flame | Amount of Soot | Amount of Dripping | Evaluation |
| 1 | — | 7 min/12 sec | X | X | Δ | flammable |
|   | — | 22 sec | X | X | X | do. |
| 2 | 2 min 49 sec/ceases to burn before reaching ref. line No. 1 | — | Δ | Δ | Δ | self-extinguishing |
|   | 1 min 15 sec/ceases to burn before reaching ref. line No. 1 | — | Δ | O | O | do. |
| 3 | 3 min 29 sec/ceases to burn before reaching ref. line No. 1 | — | Δ | X | Δ | self-extinguishing |
|   | 1 min 48 sec/ceases to burn before reaching ref. line No. 1 | — | Δ | X | Δ | do. |
| 4 | 2 min 37/sec/ceases to burn before reaching ref. line No. 1 | — | O | Δ | Δ | self-extinguishing |
|   | 1 min 12 sec/ceases to burn before reaching ref. line No. 1 | — | O | Δ | O | do. |
| 5 | 2 min 10 sec/ceases to burn before reaching ref. line No. 1 | — | Δ | X | Δ | self-extinguishing |
|   | 1 min 18 sec/ceases to burn before reaching ref. line No. 1 | — | Δ | Δ | Δ | do. |
| 6 | 2 min 24 sec/ceases to burn before reaching ref. line No. 1 | — | Δ | Δ | O | self-extinguishing |
| 7 | 2 min 50 sec/ceases to burn before reaching ref. line No. 1 | — | O | Δ | O | self-extinguishing |

Notes:
Run 1 is control.
Nikkol PBC 31: Polyoxyethylenepolyoxypropylene cetyl ether produced by Nikko Chemicals Company, HLB=9.4.
DBS: Sodium dodecylbenzenesulfonate produced by Wako Junyaku Company
Levenol A conc: Polyoxyethylene alkylamine produced by Kao-Atlas Company, Japan

EXAMPLE 3

A test piece (b) of sheet form was prepared as in Example 1, using 50 grams of polypropylene, 234 PHR of heavy calcium carbonate (Whitone B) and 2.5 PHF of a surfactant (Nikkol R 2015), following which the so obtained test piece was dipped in acid, aqueous sulfuric acid solution. After the treatment with sulfuric acidd, the test piece was thoroughly washed with water and vacuum dried for 24 hours at 60°C. The test piece was then submitted to thermal analysis and the flammability test with the results shown in Table 3.

Table 3

| Run No. | Sulfuric acid concentration (%) | Dipping Temperature (°C) | Dipping time (Hr) | Reaction Rate of calcium carbonate (%) | Water content (PHR) | Flammability test Time Required for Extinguishment after Ignition | Burning rate (min/7.6 cm) | Size of flame | Amount of soot | Amount of Dripping | Evaluation |
|---|---|---|---|---|---|---|---|---|---|---|---|
| 1 | 50 | 3 | 144 | 95.0 | 53.0 | 1 min 25 sec/ceases to burn before reaching ref. line No. 1 | — | Δ | Δ | O | self-extinguishing |
| 2 | 18.6 | 45 | 24 | 79.0 | 61.0 | 1 min 20 sec/ceaess to burn before reaching ref. line No. 1 | — | Δ | O | O | do. |
| 3 | '' | 13 | 24 | 82.0 | 66.0 | 1 min 15 sec/ceases to burn before reaching ref. line No. 1 | — | Δ | O | O | do. |
| 4 | '' | '' | 72 | 59.0 | 52.0 | 1 min 20 sec/ceases to burn before reaching ref. line No. 1 | — | Δ | Δ | O | do. |
| 5 | 18.6 | 3 | 72 | 75.5 | 62.0 | 1 min 17 sec/ceases to burn before reaching ref. line No. 1 | — | Δ | O | O | self-extinguishing |
| 6 | '' | 3 | 168 | 100 | 67.0 | 1 min 15 sec/ceases to burn before reaching ref. line No. 1 | — | Δ | O | O | do. |
| 7 | 50 | 45 | 1 | 44.0 | 21.4 | 1 min 39 sec/ceases to burn before reaching ref. line No. 1 | — | Δ | Δ | Δ | do. |

EXAMPLE 4

The experiment was carried out by operating exactly as in Example 1, except that the amount admixed of the heavy calcium carbonate was varied. "Nikkol R 2015" was used as the surfactant. The results obtained are shown in Table 4.

Table 4-(1)

| Run No. | Amount mixed of heavy calcium carbonate (PHR) | Amount of surfactant (PHF) | Test piece | Treatment time (Hr) | Rate of reaction (%) | Water content (PHR) |
|---|---|---|---|---|---|---|
| 1 | 80 | 17.0 | (b) | 96 | 78.3 | 20.3 |
| 2 | 200 | 2.5 | '' | '' | — | — |
| 3 | 234 | 6.4 | '' | 72 | 78.7 | 66.0 |
| 4 | 300 | 1.7 | '' | '' | 92.1 | 84.8 |
| 5 | 400 | 2.5 | '' | '' | 88 | 103 |
| 6 | 170 | 17.0 | (a) | 120 | — | — |
| 7 | 200 | 20.0 | '' | '' | — | — |
| 8 | 234 | 6.4 | '' | '' | — | — |
| 9 | 300 | 1.7 | '' | '' | — | — |

Table 4-(2)

| Run No. | Flammability Test Time Required for Extinguishment after Ignition | Burning rate (min/7.6cm) | Size of flame | Amount of soot | Amount of Dripping | Evaluation |
|---|---|---|---|---|---|---|
| 1 | — | 18 sec | X | X | X | flammable |
| 2 | 1 min 50 sec/ceases to burn before reaching ref. line No. 1 | — | X | Δ | Δ | self-extinguishing |
| 3 | 1 min 23 sec/ceases to burn before reaching ref. line No. 1 | — | Δ | Δ | O | do. |
| 4 | 54 sec/ceases to burn before reaching ref. line No. 1 | — | Δ | Δ | O | do. |
| 5 | 47 sec/ceases to burn before reaching ref. line No. 1 | — | O | Δ | O | do. |
| 6 | 3 min/ceases to burn before reaching ref. line No. 1 | — | Δ | Δ | Δ | do. |

Table 4-(2)-continued

| Run No. | Flammability Test | | | | | |
|---|---|---|---|---|---|---|
| | Time Required for Extinguishment after Ignition | Burning rate (min/7.6cm) | Size of flame | Amount of soot | Amount of Dripping | Evaluation |
| 7 | 2 min 50 sec/ceases to burn before reaching ref. line No. 1 | — | O | Δ | O | self-extinguishing |
| 8 | 2 min 24 sec/ceases to burn before reaching ref. line No. 1 | — | Δ | Δ | Δ | do. |
| 9 | 2 min 27 sec/ceases to burn before reaching ref. line No. 1 | — | O | Δ | O | do. |

Note:
Run No. 1 is control.

EXAMPLE 5

The experiment was operated exactly as in Run 2 of Example 1 but using polythylene instead of polypropylene (Hyzex 2208 J, melt index = 6, produced by Mitusi Petrochemical Ind. Co.) and roll temperature of 185° C. The results obtained are shown in Table 5.

Table 5-(1)

| Run No. | Amount of Heavy Calcium carbonate (PHR) | Amount of Surfactant (PHF) | Test Piece | Treatment Time (Hr) | Rate of Reaction (%) | Water content (PHR) |
|---|---|---|---|---|---|---|
| 1 | 234 | — | (b) | 96 | 12.1 | 9.0 |
| 2 | " | 4.3 | " | " | 89.0 | 59.8 |
| 3 | " | — | (a) | 216 | 7.0 | 5.0 |
| 4 | " | 4.3 | " | " | 49.7 | 27.6 |

Note:
Runs 1 and 3 are controls.

Table 5-(2)

| Run No. | Flammability Test | | | | | |
|---|---|---|---|---|---|---|
| | Time Required for Extinguishment after Ignition | Burning rate (min/7.6cm) | Size of flame | Amount of soot | Amount of Dripping | Evaluation |
| 1 | — | 28 sec | X | X | Δ | flammable |
| 2 | 1 min 31 sec/ceases to burn before reaching ref. line No. 1 | — | Δ | Δ | Δ | self-extinguishing |
| 3 | — | 7 min 30 sec | X | X | X | flammable |
| 4 | 2 min 29 sec/ceases to burn before reaching ref. line No. 1 | — | Δ | Δ | O | self-extinguishing |

Note:
Runs 1 and 3 are Controls.

EXAMPLE 6

Three grams of tribasic lead sulfate, 3.0 grams of lead stearate, 1.4 grams of calcium stearate and 1.0 gram of dibasic lead sulfate were admixed with 200 grams of finely divided polyvinyl chloride (average degree of polymerization 1000, produced by Sun Arrow Chemical Company Japan) and thoroughly dry blended, after which the mixture was wrapped about 8-inch rolls set at a temperature of 175° C. and thoroughly kneaded for 5 minutes. Colloidal calcium carbonate (Hakuenka CC) separately dry blended in advance with a prescribed amount of a surfactant "Nikkol R 2015" was then added to the foregoing mixture and, after completion of its addition in toto, the resulting mixture was kneaded for 5 minutes further to prepare a rolled sheet. A part of this sheet was cut, preheated for 10 minutes at 175° C., and compression molded for 10 minutes at 100 kg/cm² and the foregoing temperature followed by cooling to prepare test pieces (d) and (e). The so obtained test pieces were then dipped for 216 hours in 18 percent sulfuric acid at 3° C. and, after thorough water-washing, vacuum dried for 24 hours at 60° C. The flammability test was conducted by the oxygen index method. The results obtained are shown in Table 6.

Table 6

| Run No. | Amount of calcium carbonate (PHR) | Amount of surfactant (PHF) | Test Piece | Oxygen Index | |
|---|---|---|---|---|---|
| | | | | Before treatment | After treatment |
| 1 | 200 | — | (e) | 34 | 35 |
| 2 | " | — | (d) | 36 – 37 | 37 – 39 |
| 3 | " | 15 | (e) | 27 – 28 | above 90 |
| 4 | " | " | (d) | 28 – 29 | above 90 |

Note:
Runs 1 and 2 are controls

EXAMPLE 7

The experiment was operated exactly as in Run 5 of Example 1, except that the test piece (a) prepared therein was treated for 216 hours at 30° C. with a saturated aqueous oxalate dihydrate solution. When the flammability test of the so obtained test piece was conducted, it ceased to burn before reaching reference line No. 1, becoming extinct 3 minutes and 15 seconds after ignition. It thus demonstrated its self-extinguishability.

to the flammability test in accordance with the ASTM Method D-635-63. The results obtained are shown in Table 7.

The principal chemical components of the Jet Cement were as follows:

$CaO$ 59.1%, $SiO_2$ 13.8%, $Al_2O_3$ 11.4%, $SO_3$ 10.2%, $Fe_2O_3$ 1.5%, $MgO$ 0.9%, F 0.9% and $K_2O$ 0.5%.

Table 7

| Run No. | Amount of cement (PHR) | Amount of surfactant (PHF) | Dipping time (Hr) | Water content (PHR) | Flammability Test | | | | | Evaluation |
|---|---|---|---|---|---|---|---|---|---|---|
| | | | | | Time Required for Extinguishment after Ignition | Burning rate (mm/min) | Size of flame | Amount of soot | Amount of Dripping | |
| 1 | 234 | — | 168 | 3.3 | — | 13.4 | X | Δ | Δ | flammable |
| 2 | 478 | — | " | 7.9 | 0 | 5.5 | Δ | O | O | do. |
| 3 | 234 | polyacrylic acid 10 | " | 21.8 | 4 min 50 sec/ceases to burn before reaching ref. line No. 1 | — | O | O | O | self-extingushing |
| 4 | " | polyacrylic acid 33.4 | " | 63.0 | 2 min 38 sec/ " | — | O | O | O | do. |
| 5 | 478 | polyacrylic acid 10 | " | 110.0 | *2 min 15 sec/ " | — | O | O | O | do. |

Notes:
Runs 1 and 2 are controls
*Burned only after attempts at ignition were made six times for a period of 30 seconds on each occasion.

EXAMPLE 8

To 50 grams of polypropylene pellets (melt index = 12.0, produced by Tokuyama Soda Company) were added 0.2 gram each of 2,6-ditertiary-butyl paracresol (BHT) and dilaurylthiodipropionate (DLTP), after which this mixture was wrapped about 3-inch rolls (front roll 15 rpm, back roll 19 rpm) set at a temperature of 200° – 210° C. Next, a rapid hardening cement (Jet Cement (an average particle size of 15μ of Onoda Cement Co., Japan) thoroughly dry blended in advance with polyacrylic acid (Trade name ARON, produced by Toagosei Chemical Industry, Japan) was added. After completion of the addition of this cement in toto, the resulting mixture was kneaded for a further 5 minutes and then stripped from the rolls to prepare a pressed sheet. Next, this pressed sheet was preheated for 5 minutes and then compression molded at 100 kg/cm² followed by cooling at the rate of 30° C. per minute to prepare a test piece (a). The so obtained test piece was then dipped for a prescribed period of time in tap water of room temperature and dried under reduced pressure for 24 hours at 60° C. After determining the weight change at the test piece, it was submitted

EXAMPLE 9

To 50 grams of low density polyethylene pellets (trade name "Petrocen 115", produced by Toyo Soda Company, Japan) was added 0.2 gram of BHT, after which the mixture was wrapped about 3-inch rolls of a temperature 130° C. Calcined gypsum (a product of Wako Junyaku Company, a particle size of 10–100) thoroughly blended in advance with a surfactant "Nikkol R 2015" in a prescribed amount was then added to the foregoing mixture. After completion of the addition of the calcined gypsum in toto, the resulting mixture was kneaded for 5 minutes further, after which the mixture was stripped from the rolls to prepare a pressed sheet. Next, this pressed sheet, after being preheated for 5 minutes at 150° C., was compression molded at 100 kg/cm² followed by cooling at the rate of 30° C. per minute to prepare a test piece (a). This test piece was then dipped for a prescribed period of time in tap water at room temperature, vacuum dried for 24 hours at 60° C., and thereafter submitted to the flammability test. The results obtained are shown in Table 8.

Table 8

| Run No. | Amount of calcined gypsum (PHR) | Amount of surfactant (PHF) | Dipping time (Hr) | Water content (PHR) | Flammability Test | | | | | Evaluation |
|---|---|---|---|---|---|---|---|---|---|---|
| | | | | | Time Required for extinguishment after ignition | Burning rate (mm/min) | Size of flame | Amount of soot | Amount of Dripping | |
| 1 | 170 | — | 216 | 10.5 | — | 15.8 | X | X | X | flammable |
| 2 | 234 | — | " | 14.5 | — | 10.5 | X | X | Δ | do. |
| 3 | 140 | 17.0 | " | 18.0 | 4 min 5 sec/ceases to burn before reaching ref. line No. 1 | — | Δ | Δ | Δ | self-extinguishing |
| 4 | 170 | 17.0 | " | 22.0 | 3 min 40 sec/ " | — | Δ | Δ | Δ | do. |
| 5 | 200 | 10.0 | " | 30.0 | 3 min 30 sec/ " | — | Δ | Δ | Δ | do. |
| 6 | 234 | 10.0 | " | 52.0 | 3 min 45 sec/ " | — | O | O | O | do. |

Note:
Runs 1 and 2 are controls.

EXAMPLE 10

The experiment was operated as in Run 1 of Example 8 but adding various surfactants as well as varying the amounts added of the surfactants. Measurements were then made with the results shown in Table 9.

Table 9

| Run No. | Amount of Surfactant | | Water content (PHR) | Flammability Test | | | | | Evaluation |
|---|---|---|---|---|---|---|---|---|---|
| | Class | Amount (PHF) | | Time Required for Extinguishment after Ignition | Burning rate (mm/min) | Size of flame | Amount of soot | Amount of Dripping | |
| 1 | MYS-40 | 10 | 35.0 | 3 min 30 sec/ ceases to burn before reaching ref. line No. 1 | — | O | O | O | self-extinguishing |
| 2 | Nikkol R 2015 | " | 45.0 | 3 min 10 sec/ " | — | O | O | O | do. |
| 3 | PBC-31 | " | 30.0 | 3 min 45 sec/ " | — | O | O | O | do. |
| 4 | MYS-4 | " | 18.0 | 4 min 50 sec/ " | — | Δ | Δ | O | do. |
| 5 | DBS | " | 23.0 | 4 min 45 sec/ " | — | O | O | O | do. |
| 6 | Levenol A conc | " | 38.0 | 3 min 28 sec/ " | — | O | O | O | do. |
| 7 | Nikkol R 2015 | 4.3 | 30.0 | 3 min 48 sec/ ceases to burn before reaching ref. line No. 1 | — | O | O | O | self-extinguishing |
| 8 | " | 30.0 | 50.0 | 3 min 0 sec/ " | — | O | O | O | do. |

Notes:
Nikkol MYS-40: Polyoxyethylene stearate, HLB=17.4, produced by Nikko Chemicals Co.
Nikkol PBS-31: As previously described.
Nikkol MYS-4: Polyoxyethylene stearate, HLB=6.7, produced by Nikko Chemicals Co.
DBS: As previously described.
Levenol A conc: As previously described.

EXAMPLE 11

The water treatment conditions were studied, using the test piece used in Run 2 of Example 10. The results obtained are shown in Table 10.

Table 10

| Run No. | Temperature (°C) | Dipping time (Hr) | Water content (PHR) | Flammability Test | | | | | Evaluation |
|---|---|---|---|---|---|---|---|---|---|
| | | | | Time Required for Extinguishment after Ignition | Burning rate (mm/min) | Size of flame | Amount of soot | Amount of Dripping | |
| 1 | 13 | 120 | 62.0 | 2 min 37 sec/ ceases to burn before reaching ref. line No. 1 | — | O | O | O | self-extinguishing |
| 2 | 45 | 24 | 21.0 | 4 min 50 sec/ " | — | O | O | O | do. |
| 3 | " | 48 | 56.0 | 2 min 45 sec/ " | — | O | O | O | do. |
| 4 | 60 | 24 | 43.0 | 3 min 11 sec/ " | — | O | O | O | do. |

EXAMPLE 12

Three grams of tribasic lead sulfate, 3.0 grams of lead stearate, 1.4 grams of calcium stearate and 1.0 gram of dibasic lead sulfate were mixed with 200 grams of polyvinyl chloride (average degree of polymerization 1000, produced by Sun Arrow Chemical Company) and thoroughly dry blended, after which the mixture was wrapped about 8-inch rolls set at a temperature of 175° C. and thoroughly kneaded for 5 minutes. Three hundred grams of "Jet Cement" separately dry blended in advance with a prescribed amount of a surfactant "Nikkol R 2015" was added to the foregoing mixture and, after adding the latter in toto, the resulting mixture was kneaded for 5 minutes further to prepare a rolled sheet. A part of this sheet was cut out and, after preheating it for 10 minutes at 175° C., it was compression molded and then cooled to prepare a test piece (d). Next, the so obtained test piece was dipped for a prescribed period of time at room temperature, dried for 24 hours under reduced pressure and submitted to the flammability test. The results obtained are shown in Table 11.

Table 11

| Run No. | Amount of Jet cement (PHR) | Amount of Surfactant (PHF) | Water content (PHR) | Oxygen Index | |
|---|---|---|---|---|---|
| | | | | Before treatment | After treatment |
| 1 | 40 | — | 5.3 | 37 – 38 | 38 – 39 |

Table 11-continued

| Run No. | Amount of Jet cement (PHR) | Amount of Surfactant (PHF) | Water content (PHR) | Oxygen Index Before treatment | Oxygen Index After treatment |
| --- | --- | --- | --- | --- | --- |
| 2 | 40 | 15 | 12.0 | 36 – 37 | 45 |
| 3 | 150 | 15 | 75.0 | 29 – 30 | above 90 |

Note:
Run 1 is control.

EXAMPLE 13

The molding of the test piece was carried out as in Example 8 but using as surfactant 5 grams of "Nikkol R 2015" and as the inorganic metal compound 100 grams of magnesium hydrogen phosphate (a special reagent grade, a product of Wako Junyaku Company, used after pulverization in a vibratory mill to an average particle size of 15 microns), after which the resulting test piece was treated for 10 hours in boiling water and then dried under reduced pressure for 24 hours at 60° C. The water content was 92 PHR. In the flammability test, the test piece ceased to burn before reaching reference line No. 1, the time to extinction being 2 minutes and 10 seconds. The size of the flame was (0), the amount of the soot was (0) and the dripping was (0).

EXAMPLE 14

To 400 grams of polypropylene pellets were added 2 grams each of BHT and DLTP, after which the resulting mixture was wrapped about 8-inch rolls set at a temperature of 175° C. This was followed by the addition of 936 grams of "Jet Cement," which had been thoroughly blended in advance with 42 grams of a surfactant "Nikkol MYO - 10" (trade name of polyoxyethylene oleate, HLB = 10.8, produced by Nikko Chemicals Company). After the completion of the addition of the latter in toto, the kneading of the mixture was carried out for 3 additional minutes, following which it was stripped from the rolls to prepare a sheeted product which, after cooling, was rendered into pellets with a grinder. Next, these pellets were extruded into a sheet having a thickness of about 1.0 mm and width of 14 cm at a die temperature of 230° C., using a laboratory extruder having a cylinder diameter of 30 mm. A sheet having the dimensions of 10 cm in the direction of extrusion of the sheet and 8 cm in a direction transverse thereto was then cut out from the foregoing sheet. The cutout sheet was then clamped at its two ends in the direction of its extrusion in a drawing machine of the air bath heating type set at a temperature of 144° C. and, after being preheated for 5 minutes, was uniaxially drawn at drawing speeds of 0.2 – 3 meters per minute to obtain sheets having the volume draw ratios shown in Table 12.

Test pieces (c) were cut out from the drawn sheets obtained in the foregoing manner and dipped for one hour in tap water at room temperature, after which they were dried for 24 hours at about 60° C. under reduced pressure and then measured for their volume draw ratios, weight increases and flammabilities. The results obtained are shown in Table 12.

Table 12

| Run No. | Volume Draw Ratio (%) | Weight Increase (%) | Flammability Test | | | | |
| --- | --- | --- | --- | --- | --- | --- | --- |
| | | | Time Required for Extinguishment after Ignition | Size of flame | Amount of soot | Amount of Dripping | Evaluation |
| 1 | 125 | 12.8 | 80 sec/ceases to burn before reaching ref. line No. 2 | 0 | 0 | 0 | self-extinguishing |
| 2 | 145 | 15.0 | 76 sec/ʺ | 0 | 0 | 0 | do. |
| 3 | 166 | 16.8 | 70 sec/ʺ | 0 | 0 | 0 | do. |
| 4 | 0 | 14.5 | 80 sec/ʺ | 0 | 0 | 0 | do. |

Note:
In the case of Run 4 the time the test piece was dipped in tap water was increased to 168 hours.

EXAMPLE 15

A study was made of the effects of flameproofing for 30 minutes at room temperature with an aqueous solution of either 30 weight percent ammonium dihydrogen phosphate or 30 weight percent ammonium sulfate of a water-treated sheet prepared exactly as in Example 14, the volume draw ratio of which was 165 percent. The results obtained from this study are shown in Table 13. Again, the results in the case where the flameproofing treatment was not carried out and the case where water treatment was not given in advance are also shown.

Table 13

| Run No. | Flame-proofing agent | Weight Increase (%) | Time required for extinguishment after Ignition (sec) | Flammability Test | | | | |
| --- | --- | --- | --- | --- | --- | --- | --- | --- |
| | | | | Burning rate (min/sec) | Size of flame | Amount of soot | Amount of Dripping | Evaluation |
| 1 | ammonium dihydrogen phosphate | 23.0 | 4 – 6 | — | 0 | 0 | 0 | self-extinguishing |
| 2 | ammonium sulfate | 27.0 | 2 – 3 | — | 0 | 0 | 0 | ʺ |

Table 13-continued

| Run No. | Flame-proofing agent | Weight Increase (%) | Time required for extinguishment after Ignition (sec) | Flammability Test | | | | Evaluation |
|---|---|---|---|---|---|---|---|---|
| | | | | Burning rate (min/sec) | Size of flame | Amount of soot | Amount of Dripping | |
| 3 | not treated | 16.5 | 60 – 90 | — | O | O | O | '' |
| 4 | ammonium dihydrogen phosphate | 12.3 | 50 – 60 | — | O | Δ | O | '' |
| 5 | ammonium sulfate | 16.1 | 47 – 60 | — | O | Δ | O | '' |

Notes:
Run 3 shows the case where the flameproofing treatment was not carried out.
Runs 4 and 5 show cases where a water treatment was not given in advance.

EXAMPLE 16

One gram each of BHT and DLTP was added to 400 grams of polypropylene pellets (MI = 12.0, produced by Tokuyama Soda K. K.), following which this mixture was wrapped about 8-inch rolls set at a temperature of 175° C. Next, 936 grams of calcium carbonate "Whitone B", which had been thoroughly blended in advance with 42 grams of a surfactant "MYO - 10," was added to the foregoing mixture. After completion of the latter in toto, the resulting mixture was kneaded for 3 additional minutes followed by stripping it off the rolls in sheet form. After cooling this sheet, it was rendered into pellets with a grinder. Next, these pellets were extruded at a die temperature of 230° C. from a laboratory extruder having a cylinder diameter of 30 mm into a sheet having a thickness of about 1.0 mm and a width of 14 cm. A sheet having the dimensions of 10 cm in the direction of extrusion and 8 cm in a direction transverse thereto was then cut out from the foregoing sheet. The cutout sheet was then clamped at its two ends in the direction of its extrusion in a drawing machine of the air bath heating type set at a temperature of 144° C. and, after being preheated for 5 minutes, was uniaxially drawn at drawing speeds of 0.2 – 3 meters per minute to obtain sheets having the volume draw ratios shown in Table 14.

Test pieces (c) were cut out from the drawn sheets obtained in the foregoing manner and their sulfuric acid treatment was carried out by dipping them for one hour in a 13.8 percent sulfuric acid bath (about 25° C. and equipped with a stirrer). After completion of the sulfuric acid treatment, the test pieces were washed for 30 minutes in running water and vacuum dried for 24 hours at about 60° C., following which their volume draw ratios, weight increases and flammabilities were determined with the results shown in Table 14.

Table 14

| Run No. | Volume Draw Ratio (%) | Weight Increase (%) | Time Required for Extinguishment after Ignition | Flammability Test | | | | Evaluation |
|---|---|---|---|---|---|---|---|---|
| | | | | Burning rate (mm/sec) | Size of Flame | Amount of Soot | Amount of Dripping | |
| 1 | 57 | 5.7 | — | 1.8 | X | X | X | burned |
| 2 | 67 | 5.9 | — | 1.8 | X | X | X | '' |
| 3 | 83 | 11.5 | — | 0.5 | Δ | Δ | Δ | '' |
| 4 | 109 | 15.8 | — | 0.2 | Δ | Δ | Δ | '' |
| 5 | 114 | 17.2 | — | 0.1 | Δ | Δ | Δ | '' |
| 6 | 121 | 18.3 | 75 sec/ceases to burn before reaching ref. line No. 2 | — | Δ | Δ | O | self-extinguishing |
| 7 | 147 | 25.1 | 65 sec/'' | — | O | Δ | O | '' |
| 8 | 155 | 29.5 | 52 sec/ceases to burn before reaching ref. line No. 1 | — | O | O | O | '' |
| 9 | 156 | 27.2 | 57 sec/'' | — | O | Δ | O | '' |
| 10 | 165 | 28.2 | 56 sec/ceases to burn before reaching ref. No. 1 | — | O | O | O | self-extinguishing |
| 11 | 170 | 30.4 | 48 sec/'' | — | O | O | O | '' |
| 12 | 0 | 20.0 | 110 sec/'' | — | Δ | Δ | 0 | '' |

Note:
Run 12 shows the case where the sulfuric acid treatment was carried out for 24 hours.

As is apparent from Table 14, in concomitance with an increase in the volume draw ratio, a rapid increase in weight increase is also demonstrated. Hence, it is apparent that the effects of the volume draw ratio is great in the case of a polypropylene-surfactant-calcium carbonate type sheet. Further, it is seen that under the conditions of this example a self-extinguishing sheet can be obtained at a weight increase of above about 20 percent, i.e., a volume draw ratio of above about 130 percent.

EXAMPLE 17

Pellets prepared exactly as in Example 16 were used, and a sheet of a thickness of about 0.15 mm was extruded at a die temperature of 230° C. from a laboratory extruder having a cylinder diameter of 30 mm. Sheets thus prepared were uniaxially drawn by operating as in Example 16 but using a temperature of 130° C. to obtain sheets of volume draw ratios shown in Table 15. These sheets were treated with sulfuric acid as in Example 16, after which the effects of the volume draw ratio were investigated. The results obtained are shown in Table 15.

dibasic lead sulfate were mixed with 200 grams of finely divided polyvinyl chloride (average degree of Table 15

| Run No. | Volume Draw Ratio (%) | Weight Increase (%) | Flammability Test | | | | | Evaluation |
|---|---|---|---|---|---|---|---|---|
| | | | Time Required for Extinguishment after Ignition | Burning rate (mm/sec) | Size of Flame | Amount of Soot | Amount of Dripping | |
| 1 | 22 | 12.1 | — | 1.4 | X | X | X | burned |
| 2 | 40 | 16.9 | — | 0.35 | | | | " |
| 3 | 56 | 21.2 | 65 sec/ceases to burn before reaching ref. line No. 1 | — | Δ | Δ | Δ | self extinguishing |
| 4 | 88 | 28.0 | 54 sec/" | — | O | O | O | " |
| 5 | 105 | 31.8 | 50 sec/" | — | O | O | O | " |
| 6 | 119 | 34.2 | 46 sec/" | — | O | O | O | " |
| 7 | 157 | 40.1 | 43 sec/" | — | O | O | O | " |
| 8 | 0 | 15.8 | — | | Δ | Δ | X | burned |

Note:
Run 8 shows the case where 0.07 mm extruded sheet was used, and the sulfuric acid treatment was carried out for 16 hours.

It can be seen from Table 15 that when the thickness of the sheet is small, sufficient treatment can be performed even at a low draw ratio. Furthermore, it can be appreciated that under the present conditions, a self-extinguishing sheet can be obtained at a weight increase ratio of more than about 20 percent, namely at a volume draw ratio of about 50 percent.

EXAMPLE 18

Example 16 was repeated but using high density polyethylene (trade name "Hyzex 2208T," MI = 6, produced by Mitsui Petrochemical Industries) instead of polypropylene and kneading the mixture at a temperature of 185° C. to mold a sheet. This sheet, after being preheated for 5 minutes, was drawn using a drawing apparatus (identical to that used in Example 16) set at a temperature of 110° C. to prepare a test piece (c), after which the test piece was treated with sulfuric acid as in Example 16. The test piece was then tested with the results shown in Table 16.

polymerization 1000, produced by Sun Arrow Chemical Company) and, after the components were thoroughly dry blended, the mixture was wrapped about 8-inch rolls set at a temperature of 175° C. and kneaded for 5 minutes. Four hundred grams of colloidal calcium carbonate "Hakuenka CC" which had been separately dry blended in advance with 10 grams of a surfactant "Nikkol R 2015" was then added to the foregoing mixture. On completion of the addition of the latter in toto, the resulting mixture was kneaded for 5 minutes further to prepare a rolled sheet. A part of this sheet was cut out and, after being preheated for 10 minutes at 175° C., compression molded for 10 minutes at the same temperature and 100 kg/cm² followed by cooling to prepare a sheet of a thickness about 1.0 mm.

This sheet, after being preheated for 10 minutes at 95° C., was drawn with the same drawing apparatus as that used in Example 16 to obtain a test piece (c) of a volume draw ratio of 163 percent. This test piece (c) was treated with sulfuric acid as in Example 16 with the Table 16

| Run No. | Volume Draw Ratio (%) | Weight Increase (%) | Flammability Test | | | | | Evaluation |
|---|---|---|---|---|---|---|---|---|
| | | | Time Required for Extinguishment after Ignition | Burning rate (mm/sec) | Size of Flame | Amount of Soot | Amount of Dripping | |
| 1 | 108 | 16.3 | — | 0.2 | Δ | Δ | Δ | burned |
| 2 | 120 | 20.4 | 71 sec/ceases to burn before reaching ref. line No. 1 | — | O | Δ | O | self-extinguishing |
| 3 | 164 | 28.9 | 57 sec/" | — | O | O | O | " |
| 4 | 0 | 19.3 | 1 min 50 sec/" | — | Δ | O | O | " |

Note:
Run 4 shows the case where a 0.5 mm extruded sheet was used, and the surfuric acid treatment was carried out for 24 hours.

EXAMPLE 19

Three grams of tribasic lead sulfate, 3.0 grams of lead stearate, 1.4 grams of calcium stearate and 1.0 gram of results shown in Table 17.

Table 17

| Run No. | Drawn or Not Drawn | Treatment Time (hr) | Weight Increase (%) | Flammability Test Oxygen Index |
|---|---|---|---|---|
| 1 | drawn | 1 | 30.1 | 95 |

Table 17-continued

| Run No. | Drawn or Not Drawn | Treatment Time (hr) | Weight Increase (%) | Flammability Test Oxygen Index |
|---------|--------------------|--------------------|---------------------|-------------------------------|
| 2       | not drawn          | 96                 | 22.0                | 92                            |

Note.
Run 2 shows the case where a 0.5 mm pressed sheet was used.

As is apparent from Table 17, it can be seen that the time for achieving flame retardancy can be shortened when the test piece is one which has been drawn. Further, the formation of soot and evolution of gas were exceedingly small.

EXAMPLE 20

The drawn sheet of volume draw ratio 156 percent prepared as in Example 16 was treated with a saturated aqueous oxalic acid dihydrate solution instead of sulfuric acid. The results obtained are shown in Table 18.

Table 18

| Run No. | Drawn or not Drawn | Treatment Temperature (°C) | (Hr) | Time required for Extinguishment after Ignition | Burning rate (mm/sec.) | Size of Flame | Amount of Soot | Amount of Dripping | Evaluation |
|---------|--------------------|---------------------------|------|------------------------------------------------|------------------------|---------------|----------------|--------------------|-----------|
| 1       | drawn              | 30                        | 1    | 53 sec/ceases to burn before reaching ref. line No. 1 | —                      | O             | O              | O                  | self-extinguishing |
| 2       | not drawn          | "                         | 216  | 1 min 45 sec/ ″                                | —                      | O             | Δ              | Δ                  | ″         |

EXAMPLE 21

A test piece (c) was prepared exactly as in Example 16, except that the sheet was drawn biaxially simultaneously. The results of the tests that were conducted using this test piece are shown in Table 19.

Table 19

| Run No. | Volume Draw Ratio (%) | Weight Increase (%) | Time Required for Extinguishment after Ignition | Burning rate (mm/sec) | Size of Flame | Amount of Soot | Amount of Dripping | Evaluation |
|---------|-----------------------|---------------------|------------------------------------------------|------------------------|---------------|----------------|--------------------|-----------|
| 1       | 117                   | 20.1                | 77 sec/ceases to burn before reaching ref. line No. 1 | —                      | Δ             | Δ              | O                  | self-extinguishing |
| 2       | 146                   | 25.8                | 63 sec/ ″                                      | —                      | O             | Δ              | O                  | ″         |
| 3       | 156                   | 27.6                | 54 sec/ ″                                      | —                      | O             | Δ              | O                  | ″         |
| 4       | 167                   | 29.0                | 50 sec/ ″                                      | —                      | O             | O              | O                  | ″         |
| 5       | 175                   | 31.0                | 43 sec/ ″                                      | —                      | O             | O              | O                  | ″         |

EXAMPLE 22

In this example, the secondary treatment with a flameproofing agent was investigated.

The experiment was operated as in Example 16 in blending 400 grams of polypropylene, 40 grams of a surfactant (trade name "Nikkol MYO-10") and 743 grams of calcium carbonate (trade name "Whitone B," produced by Shiraishi Calcium Company) to prepare a test piece having a volume draw ratio of 145 percent. Test pieces (c) obtained in this manner were then treated for 10 minutes at 50° C. with 44 wt. percent sulfuric acid under agitation, followed by water-washing and thereafter dipping for 30 minutes at room temperature in aqueous solutions of various flameproofing agents. They were then withdrawn, washed in water for 20 seconds and dried for 24 hours at 60° C. under reduced pressure. The weight increases and flammabilities of the so treated test piece were then investigated with the results shown in Table 20.

Table 20

| Run No. | Chemicals | Concentration (wt%) | Weight increase (%) | Time Required for Extinguishment after Ignition | Burning rate (mm/sec) | Size of flame | Amount of soot | Amount of Dripping | Evaluation |
|---------|-----------|---------------------|---------------------|------------------------------------------------|------------------------|---------------|----------------|--------------------|-----------|
| 1       | —         | —                   | 31.5                | 57 sec/ceases to burn before reaching ref. line | —                      | O             | O              | O                  | self-extinguishing |

Table 20-continued

| Run No. | Chemicals | Concentration (wt%) | Weight increase (%) | Time Required for Extinguishment after Ignition | Burning rate (mm/sec) | Size of flame | Amount of soot | Amount of Dripping | Evaluation |
|---|---|---|---|---|---|---|---|---|---|
| 2 | Ammonium sulfate | 30 | 41.8 | 2 sec/ No. 1 " | — | O | O | O | " |
| 3 | Ammonium molybdate | 30 | 34.8 | 5 sec/ " | — | O | O | O | " |
| 4 | Ammonium dihydrogen phosphate | 30 | 37.9 | 5 sec/ " | — | O | O | O | " |
| 5 | Ammonium monohydrogen phosphate | 30 | 46.0 | 4 sec/ " | — | O | O | O | " |
| 6 | Ammonium dihydrogen phosphate<br>Ammonium bromide | 15<br>15 | 29.7 | 4 sec/ceases to burn before reaching ref. line No. 1 | — | O | O | O | " |
| 7 | Ammonium dihydrogen phosphate<br>Ammonium sulfate | 15<br>15 | 48.0 | 2 sec/ " | — | O | O | O | " |
| 8 | Ammonium dihydrogen phosphate | 30 | 26.2 | 92 sec/ " | — | Δ | Δ | O | " |
| 9 | Ammonium dihydrogen phosphate | 30 | — | Burned completely | 1.95 | Δ | Δ | Δ | burned |

Note:
Run 1 shows the case where only the sulfuric acid treatment was carried out.
Run 8 shows the case where an undrawn 0.5 mm sheet was treated with sulfuric acid (weight increase 26.1%) and thereafter treated for 30 minutes with an ammonium dihydrogen phosphate solution
Run 9 shows the case where only the treatment with a flameproofing agent was carried out without performing the sulfuric acid treatment As is apparent from Table 20, it can be seen that a much greater enhancement of flame retardancy can be achieved by impregnating the test piece with an aqueous solution of a flameproofing agent subsequent to its treatment with sulfuric acid. Further, it can be seen that this effect cannot possibly be achieved by the mere treatment with an aqueous flameproofing agent solution (see Runs 8 and 9).

EXAMPLE 23

In this example the effects of the concentration of the aqueous ammonium monohydrogen phosphate solution used in the treatment were investigated. Example 22 was repeated by operating exactly as described therein, except that the test piece was treated for 30 minutes with 8.8 wt. percent sulfuric acid. The treatment by means of the ammonium monohydrogen phosphate solution was carried out for 10 minutes. The results obtained are shown in Table 21.

test was carried out as in Examples 1–23, except that the time during which the flame was held in contact with the specimen was 10 seconds.

EXAMPLE 24

One gram each of BHT and DLTP were added to 400 grams of polypropylene pellets (MI = 12.0, produced by Tokuyama Soda K. K.), after which this mixture was wrapped around 8-inch rolls set at a temperature of 175° C. Next, calcium carbonate "Whitone B" thoroughly blended in advance with 4.5 parts of a surfactant "Nikkol MYO - 10" was added in a prescribed amount to the foregoing mixture. After completion of the addition of the calcium carbonate in toto, the resulting mixture was kneaded for 3 additional minutes, following which it was stripped from the rolls in a sheet form and rendered into pellets with a grinder. The so obtained pellets were then extruded from a laboratory extruder having a cylinder diameter of 30 mm at a die temperature of 215° C. to obtain a monofilament having a diameter of about 1.0 mm, which was then drawn in an air bath heating type laboratory drawing apparatus set at a temperature of 144° C. to obtain a monofila- Table 21

| Run No. | Concentration (wt %) | Weight increase (%) | Time Required for Extinguishment after Ignition | Burning rate (mm/sec) | Size of flame | Amount of soot | Amount of Dripping | Evaluation |
|---|---|---|---|---|---|---|---|---|
| 1 | 10 | 30.0 | 22 sec/ceases to burn before reaching ref. line No. 1 | — | O | O | O | self-extinguishing |
| 2 | 20 | 31.8 | 6 sec/ " | — | O | O | O | " |
| 3 | 30 | 34.6 | 4 sec/ " | — | O | O | O | " |
| 4 | 36 | 38.2 | 3 sec/ " | — | O | O | O | " |
| 5 | — | — | 83 sec/ " | — | Δ | Δ | O | " |

Note:
Run 5 shows the case where the ammonium monohydrogen phosphate treatment was not performed after the sulfuric acid treatment (weight increase 26.2%).

The following Examples 24–29 are for illustrating the case where the shaped article is a filament. In these examples filaments having a length of either 127 mm or 122mm were used as specimens, and the flammability ment of a volume draw ratio of 130 percent as shown in Table 22.

A 127-mm-long specimen was cut from the drawn monofilament obtained as described above and submitted to a sulfuric acid treatment by dipping it for a prescribed period of time in a 44 weight percent sulfuric acid bath (50°C., liquid circulated by means of a pump at a flow rate of 1.0 cm/sec.). After completion of the sulfuric acid treatment, the filament was washed in water for 10 minutes and dried under reduced pressure for 24 hours at 60°C. The weight increase and flammability of the filament was then determined with the results shown in Table 22.

ping at all. Again, the effects of the treatment were nil in the case where a surfactant was not used (Run 1). Further, it is seen that the treatment is greatly facilitated in the case the filament is one which has been drawn.

EXAMPLE 25

In this example, the effects of treating a filament with aqueous solutions of typical flameproofing agents were investigated. A sulfuric acid-treated filament, which was prepared as in Run 2 of Example 24, was used. This filament was dipped for 10 minutes in an aqueous solution of 30 weight percent of a flameproofing agent, Table 22

| Run No. | Amount of calcium carbonate (g) | Sulfuric acid treatment time (min) | Weight increase (%) | Flammability Test |||||  |
|---|---|---|---|---|---|---|---|---|---|
| | | | | Time Required for a Extinguishment after Ignition | Burning rate (min/ 7.6 cm) | Size of flame | Amount of soot | Amount of Dripping | Evaluation |
| 1 | 186 | 60 | 0 | — | 7.0 | Δ | X | X | burned |
| 2 | 234 | 30 | 37.0 | 57 sec/ceases to burn before reaching ref. line No. 2 | — | O | O | O | self-extinguishing |
| 3 | 186 | — | — | — | 6.7 | Δ | X | X | burned |
| 4 | 186 | 100 | 19.0 | 76 sec/ceases to burn before reaching ref. line No. 2 | — | O | O | Δ | self-extinguishing |

Note:
Run 1 shows the case where the sulfuric acid treatment was carried out without adding a surfactant.
Run 3 shows the case where the sulfuric acid treatment was not performed.

As is apparent from Table 22, when a drawn monofilament is treated with sulfuric acid, it can be seen that there is a marked decrease in the rate of burning as compared with the case of an untreated filament (Run 3), as well as a smaller flame and less soot and no dripping after which the filament was water-washed for 30 seconds and dried under reduced pressure for 24 hours at 60°C. The weight increase and flammability of the so treated filament were then determined with the results shown in Table 23.

Table 23

| Run No. | Flameproofing agent | Weight increase (%) | Flammability Test |||||
|---|---|---|---|---|---|---|---|
| | | | Time Required for Extinguishment after Ignition | Burning rate (mm/sec) | Size of flame | Amount of soot | Amount of Dripping | Evaluation |
| 1 | — | 37.0 | 59 sec/ceases to burn before reaching ref. line No. 1 | — | O | O | O | self-extinguishing |
| 2 | Ammonium sulfate | 49.2 | 2 sec/ceases to burn brfore reaching ref. line No. 2 | — | O | O | O | " |
| 3 | Ammonium molybdate | 42.0 | 7 sec/ " | — | O | O | O | " |
| 4 | Ammonium dihydrogen phosphate | 45.5 | 5 sec/ " | — | O | O | O | " |
| 5 | Ammonium monohydrogen phosphate | 51.5 | 4 sec/ceases to burn before reaching ref. line No. 1 | — | O | O | O | self-extinguishing |
| 6 | Ammonium dihydrogen phosphate & ammonium sulfate used conjointly | 53.1 | 3 sec/ " | — | O | O | O | " |
| 7 | Ammonium sulfate | 15.3 | — | 2.8 | O | O | Δ | burned |

Notes:
Run 1 shows the case where only the sulfuric acid treatment was performed.
Run 7 shows the case where only the treatment with the flameproofing agent was performed, and the sulfuric acid treatment was not performed.

As is apparent from Table 23, when the treatment with sulfuric acid and that with a flameproofing agent are conjointly performed on a drawn monofilament, it can be seen that the filament can be made greatly flame retardant.

EXAMPLE 26

Example 24 was repeated but using high density polyethylene (trade name "Hyzex 2208 J, MI =6," produced by Mitsui Petrochemical Ind. Co.) instead of polypropylene and extruding this polyethylene at 180° C. to prepare an extruded monofilament of about 1.0 mm diameter. The so extruded monofilament, after being preheated for 5 minutes, was drawn in a drawing apparatus (identical to that used in Example 24) set at a temperature of 108° C. to obtain a monofilament of a volume draw ratio of 145 percent. Using this specimen, the sulfuric acid and ammonium sulfate treatments were carried out as in Example 25 with the results shown in Table 24.

extruder having a cylinder diameter of 40 mm with a tip temperature of 185° C. This filament was then drawn in a drawing apparatus (identical to that used in Example 1) set at a temperature of 98° C. to obtain a monofilament of a volume draw ratio of 138 percent. A 122-mm-long specimen cut from this monofilament was then treated with sulfuric acid as in Example 24 with the results shown in Table 25.

Table 25

| Run No. | Drawn or Undrawn | Treatment Time (min) | Weight Increase (%) | Flammability Test Oxygen Index |
|---|---|---|---|---|
| 1 | drawn | 60 | 31.0 | 95 |
| 2 | undrawn | 4200 | 23.2 | 92 |

Note:
Run 2 shows the case where an extruded filament of about 0.7 mm diameter was used.

It is thus seen from the foregoing results that flame retardancy can be readily imparted in the case the Table 24

| Run No. | Weight increase (%) | Time Required for Extinguishment after Ignition | Flammability Test ||||  Evaluation |
| | | | Burning rate (mm/sec) | Size of flame | Amount of soot | Amount of Dripping | |
|---|---|---|---|---|---|---|---|
| 1 | 37.5 | 60 sec/ceases to burn before reaching ref. line No. 2 | — | O | O | O | self-extinguishing |
| 2 | 50.1 | 2 sec/ceases to burn before reaching ref. line No. 1 | — | O | O | O | " |

Note:
Run 1 shows the case where only the sulfuric acid treatment was performed.

EXAMPLE 27

Three grams of tribasic lead sulfate, 3.0 grams of lead stearate, 1.4 grams of calcium stearate and 1.0 gram of dibasic lead sulfate were admixed with 200 grams of finely divided polyvinyl chloride (average degree of polymerization 1020, produced by Sun Arrow Chemical Company) and, after thorough blending of the components, the mixture was wrapped about 8-inch rolls set at a temperature of 175° C. and kneaded for 5 minutes. Next, colloidal calcium carbonate ("Hakuenka CC") dry blended in advance with 10 grams of a surfactant (identical to that used in Example 24) was added to the foregoing mixture. After completion of the addition of the calcium carbonate in toto, the resulting mixture was kneaded for 5 minutes further to prepare a rolled sheet, which was rendered into pellets by grinding. These pellets were then extruded into a monofilament of about 1.0 mm diameter, using an filament is one which has been drawn. Further, in the case of both Runs 1 and 2 the amount of burning gas was exceedingly small, and there was hardly any soot.

EXAMPLE 28

Run 2 of Example 25 was repeated but using a saturated aqueous oxalic acid dihydrate solution instead of the 44 weight percent sulfuric acid. The experiment was otherwise carried out exactly as described in Example 25 in treating the filament with the results shown in Table 26.

Table 26

| Run No. | Drawn or undrawn | Time Required for Extinguishment after Ignition | Flammability Test |||| Evaluation |
| | | | Burning rate (mm/sec) | Size of flame | Amount of soot | Amount of Dripping | |
|---|---|---|---|---|---|---|---|
| 1 | drawn | 2 sec/ceases to burn before reaching ref. line No. 1 | — | O | O | O | self-extinguishing |
| 2 | undrawn | 74 sec/ceases to burn before reaching ref. line No. 2 | — | O | Δ | Δ | " |

EXAMPLE 29

Pellets obtained by operating as in Example 24 and having a composition indicated in Run 3 of Table 22 of Example 24 were used, and a hollow filament having a diameter of 1.5 mm and a skin thickness of 0.18 mm was obtained therefrom by extrusion from an extruder having a cylinder diameter of 30 mm. This hollow filament was heated at about 100°C. and drawn (the draw ratio was 2.8X the length) to obtain a drawn hollow filament. A specimen of 127-mm length was cut from this filament and submitted to a sulfuric acid treatment and an ammonium sulfate treatment by the methods of Examples 24 and Example 25 (Run 2), respectively, to impart it flame retardancy, with the result that its weight increase was 49 percent. While this specimen can be ignited with a bunsen burner, it immediately ceased to burn on removal of the flame. Further, the flame was not only small, but also there was no soot and hardly any dripping.

What is claimed is:

1. A process for producing flame-retardant shaped articles of thermoplastic synthetic resins which comprises: (1) dispersing homogeneously in 100 parts by weight of a thermoplastic synthetic resin 100 – 500 parts by weight of an inorganic metal compound of particle size 0.01 – 500 microns and 0.01 – 500 parts by weight of a surfactant, said inorganic metal compound being one capable of forming a hydrate by reacting with a member of the group consisting of water and an aqueous acid solution; (2) forming the resulting composition into a desired shaped article; and (3) contacting the so obtained shaped article with a liquid selected from the group consisting of water and an aqueous acid solution, thereby converting the inorganic metal compound contained in the shaped article to a hydrate.

2. The process of claim 1 wherein the inorganic metal compound is one capable of forming a hydrate by reacting with a member of the group consisting of water and an aqueous acid solution and selected from the group consisting of the oxides, hydroxides and salts of metals.

3. The process of claim 1 wherein the surfactant is selected from the group consisting of anionic surfactants and nonionic surfactants having an HLB value of 8 – 17.

4. The process of claim 1 wherein the aqueous acid solution of step (3) is selected from the group consisting of aqueous solutions of sulfuric acid and oxalic acid.

5. The process of claim 1 wherein said shaped article is a member selected from the group consisting of sheets and filaments.

6. The process of claim 1 which includes an additional step of drawing the shaped article uniaxially or biaxially prior to step (3).

7. The process of claim 6 wherein the shaped article is drawn to a volume draw ratio of from 50 to 400 percent, the volume draw ratio Y being defined by $$Y = \frac{W-V}{V} \times 100\%$$

wherein V is volume per unit weight before drawing, and W is volume per unit weight after drawing.

8. The process of claim 7 wherein the shaped article is drawn to a volume draw ratio of from 200 to 300 percent.

9. The process of claim 1 wherein 230 to 400 parts by weight of the inorganic metal compound is used in step (1).

10. The process of claim 1 wherein 0.1 to 100 parts by weight of the surfactant is used in step (1).

11. The process of claim 10 wherein 1 to 40 parts by weight of the surfactant is used.

12. The process of claim 1 wherein the inorganic metal compound in step (1) has a particle size of from 0.01 to 200 microns.

13. The process of claim 1 wherein the liquid in step (3) has a temperature of from 0° to 150° C.

14. The process of claim 13 wherein the liquid has a temperature of from 5° to 90° C.

15. The process of claim 1 wherein step (3) is performed for a period of from 10 seconds to 10 hours.

16. The process of claim 6 wherein the inorganic metal compound is one capable of forming a hydrate by reacting with a member of the group consisting of water and an aqueous acid solution and is selected from the group consisting of the oxides, hydroxides and salts of metals.

17. The process of claim 6 wherein the surfactant is selected from the group consisting of anionic surfactants and nonionic surfactants having an HLB value of 8 – 17.

18. The process of claim 6 wherein the aqueous acid solution of step (3) is selected from the group consisting of aqueous solutions of sulfuric acid and oxalic acid.

19. The process of claim 6 wherein said shaped article is a member selected from the group consisting of sheets and filaments.

20. The process of claim 6 wherein 230 to 400 parts by weight of the inorganic metal compound is used in step (1).

21. The process of claim 6 wherein 0.1 to 100 parts by weight of the surfactant is used in step (1).

22. The process of claim 6 wherein 1 to 40 parts by weight of the surfactant is used.

23. The process of claim 6 wherein the inorganic metal compound in step (1) has a particle size of from 0.01 to 200 microns.

24. The process of claim 6 wherein the liquid in step (3) has a temperature of from 0° to 150° C.

25. The process of claim 6 wherein the liquid has a temperature of from 5° to 90° C.

26. The process of claim 6 wherein step (3) is performed for a period of from 10 seconds to 10 hours.

27. The process of claim 6 including an additional step of treating the product of step (3) with a known flameproofing agent.

28. The process of claim 1 in which the thermoplastic synthetic resin is selected from the group consisting of homopolymers, polymers and copolymers of ethylene, propylene, and butylene.

29. The process of claim 1 in which the thermoplastic synthetic resin is a vinyl compound selected from the group consisting of vinyl chloride, acrylonitrile, methyl methacrylate, vinyl acetate, and styrene.

30. The process of claim 1 in which the thermoplastic synthetic resin is a copolymer of an olefin monomer selected from the group consisting of ethylene, propylene, and butylene, and a vinyl monomer selected from the group consisting of vinyl chloride, acrylonitrile, methyl acrylate, vinyl acetate, and styrene.

31. The process of claim 30 in which the thermoplastic synthetic resin is a terpolymer of the olefin and vinyl monomers.

32. The process of claim 1 in which the thermoplastic synthetic resin is polyethylene terephthalate.

33. The process of claim 1 in which the thermoplastic synthetic resin is polyoxymethylene.

34. The process of claim 1 in which the inorganic metal compound is an oxide of a metal selected from the group consisting of calcium, aluminum, silicon, boron, titanium, zirconium, and iron.

35. The process of claim 1 in which the inorganic metal compound is selected from the group consisting of magnesium hydrogen phosphate, magnesium phosphite, basic magnesium carbonate, and aluminum sulfate.

36. The process of claim 1 in which the inorganic metal compound is selected from the group consisting of cement, zeolite, and clay.

37. The process of claim 1 in which the inorganic metal compound capable of forming a hydrate upon reaction with water is selected from the group consisting of cement, quicklime, soluble anhydrous gypsum, calcined gypsum, alumina, silica, boron oxide, titania, zirconia, iron oxide, zeolite, magnesium hydrogen phosphate, magnesium phosphite, basic magnesium carbonate, magnesium chloride, and barium oxide.

38. The process of claim 37 wherein the inorganic metal compound is selected from the group consisting of gypsum and cement.

39. The process of claim 1 in which the inorganic metal compound capable of forming a hydrate upon reaction with an aqueous acid solution is selected from the group consisting of calcium hydroxide, calcium carbonate, tricalcium phosphate, calcium chloride, calcium acetate, and calcium oxalate.

40. The process of claim 1 in which the inorganic metal compound is selected from the group consisting of calcium hydroxide, calcium carbonate, and calcium oxide.

41. The process of claim 1 in which the inorganic metal compound of step (1) is selected from the group consisting of calcium hydroxide, calcium carbonate, magnesium sulfate, basic magnesium carbonate, tricalcium phosphate, gypsum, cement, and calcined gypsum.

42. The process of claim 1 in which the liquid of step (3) is selected from the group consisting of water, aqueous solution of sulfuric acid, and aqueous solution of oxalic acid dihydrate.

43. The process of claim 6 in which the thermoplastic synthetic resin of step (1) is selected from the group consisting of polyethylene, polypropylene, and polyvinyl chloride.

44. The process of claim 6 in which the inorganic metal compound of step (1) is selected from the group consisting of cement and calcium carbonate.

45. The process of claim 6 in which the liquid of step (3) is selected from the group consisting of water, aqueous solution of sulfuric acid, and aqueous solution of oxalic acid dihydrate.

* * * * *

UNITED STATES PATENT AND TRADEMARK OFFICE
CERTIFICATE OF CORRECTION

PATENT NO. : 3,953,565
DATED : April 27, 1976
INVENTOR(S) : MIZUTANI, ET AL.

It is certified that error appears in the above-identified patent and that said Letters Patent are hereby corrected as shown below:

Item 73, line 2, before "Japan" insert -- Yamaguchi-ken, --

Signed and Sealed this

Thirteenth Day of July 1976

[SEAL]

Attest:

RUTH C. MASON
*Attesting Officer*

C. MARSHALL DANN
*Commissioner of Patents and Trademarks*